(12) United States Patent
Shi et al.

(10) Patent No.: US 11,723,019 B2
(45) Date of Patent: Aug. 8, 2023

(54) UPLINK DATA TRANSMISSION METHOD AND RELEVANT DEVICE

(71) Applicant: GUANGDONG OPPO MOBILE TELECOMMUNICATIONS CORP., LTD., Guangdong (CN)

(72) Inventors: Cong Shi, Guangdong (CN); Jia Shen, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 396 days.

(21) Appl. No.: 17/166,735

(22) Filed: Feb. 3, 2021

(65) Prior Publication Data

US 2021/0160904 A1 May 27, 2021

Related U.S. Application Data

(63) Continuation of application No. PCT/CN2019/081806, filed on Apr. 8, 2019.

(30) Foreign Application Priority Data

Jun. 20, 2018 (CN) .......................... 201810639822.2

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC ............................ H04W 72/23; H04W 72/1268
USPC .......................................................... 370/329
See application file for complete search history.

(56) References Cited

U.S. PATENT DOCUMENTS

| 8,909,283 | B2 | 12/2014 | Park et al. |
| 2012/0201188 | A1 | 8/2012 | Ishii et al. |
| 2013/0089044 | A1 | 4/2013 | Park et al. |
| 2014/0233538 | A1 | 8/2014 | Zhang et al. |

(Continued)

FOREIGN PATENT DOCUMENTS

| CN | 101827447 A | 9/2010 |
| CN | 102300331 A | 12/2011 |

(Continued)

OTHER PUBLICATIONS

International Search Report in the international application No. PCT/CN2019/081806, dated Jun. 27, 2019. 5 pages with English translation.

(Continued)

*Primary Examiner* — Peter G Solinsky

(74) *Attorney, Agent, or Firm* — Perkins Coie LLP

(57) ABSTRACT

An uplink data transmission method and a relevant device are provided. The method comprises: receiving first signalling sent by a network side, so that a terminal side can ensure the transmission efficiency of an uplink authorized resource, wherein the first signalling is used for allocating the uplink authorized resource to the terminal device; and multiplexing data of a first logical channel to the uplink authorized resource allocated by the first signaling and transmitting same.

20 Claims, 2 Drawing Sheets

201

Receiving first signaling which is sent by a network side, the first signaling being configured to allocate an uplink licensed resource to a terminal device

202

Multiplexing data of a first LCH to the uplink licensed resource allocated through the first signaling for transmission

(56) References Cited

U.S. PATENT DOCUMENTS

| | | | | |
|---|---|---|---|---|
| 2019/0149365 | A1* | 5/2019 | Chatterjee | H04L 25/0226 370/329 |
| 2019/0386770 | A1* | 12/2019 | Wei | H04L 1/007 |
| 2019/0394785 | A1* | 12/2019 | He | H04L 1/0016 |

FOREIGN PATENT DOCUMENTS

| | | |
|---|---|---|
| CN | 102685914 A | 9/2012 |
| CN | 103298130 A | 9/2013 |
| CN | 103975633 A | 8/2014 |
| WO | 2011040595 A1 | 4/2011 |
| WO | 2017194829 A1 | 11/2017 |

OTHER PUBLICATIONS

MCC Support, "Final Report of 3GPP TSG RAN WG1 #93 v1.0.0" (Busan, South Korea, May 21-25, 2018), 3GPP TSG RAN WG1 Meeting #94 R1-1808001, Gothenburg, Sweden, Aug. 20-24, 2018. 198 pages.

Written Opinion of the International Search Authority in the international application No. PCT/CN2019/081806, dated Jun. 27, 2019. 9 pages with English translation.

OPPO. "Further discussion on additional IL caused by SRS switch" 3GPP TSG-RAN WG4 Meeting #88bis, R4-1812719, Oct. 12, 2018 (Oct. 12, 2018), sections 1-3.

OPPO. "Discussion on additional IL caused by SRS switch" 3GPP TSG-RAN WG4 Meeting #88, R4-1810553, Aug. 10, 2018 (Aug. 10, 2018), sections 1-3, and figures 1-3.

OPPO. "Introduction of SRS switch IL for 4.9GHz" 3GPP TSG-RAN WG4#88, R4-1810551, Aug. 10, 2018 (Aug. 10, 2018), entire document.

Hua Wei et al. "Partial reciprocity based CSI acquisition mechanism" 3GPP TSG RAN WG1 Meeting #90, R1-1714338, Aug. 25, 2017 (Aug. 25, 2018), entire document.

International Search Report in the international application No. PCT/CN2018/122886, dated May 17, 2019.

First Office Action of the Chinese application No. 201980014554.8, dated May 27, 2022. 16 pages with English translation.

* cited by examiner

UPLINK DATA TRANSMISSION METHOD AND RELEVANT DEVICE

CROSS-REFERENCE TO RELATED APPLICATION

This is a continuation application of International Patent Application No. PCT/CN2019/081806, filed on Apr. 8, 2019, which claims priority to Chinese Patent Application No. 201810639822.2, filed to the Patent Office of the People's Republic of China on Jun. 20, 2018, entitled "Uplink Data Transmission Method and Relevant Device", the disclosures of which are hereby incorporated by reference in their entirety.

BACKGROUND

In New Radio (NR), similar to Long Term Evolution (LTE) uplink data transmission process, when a terminal receives an uplink licensed resource (dynamic licensed or semi-statically configured licensed resource), the terminal needs to execute data multiplexing by adopting a process which can also be considered as Logical Channel Prioritization (LCP). That is, the terminal multiplexes data of different Logical Channels (LCHs) to the uplink licensed resource according to a certain configuration rule.

In NR, Radio Resource Control (RRC) configures other three parameters for each LCH: a priority, a Priority Bit Rate (PBR) and a Bucket Size Duration (BSD), and Media Access Control (MAC) determines an order in which the respective LCHs obtain service on a given uplink licensed resource according to the three parameters. An NR MAC protocol specifies an LCP process. When UE obtains an uplink resource grant, the UE may allocate a licensed resource to different LCHs according to the specified LCP process.

However, the transmission efficiency on an uplink licensed resource cannot be ensured in the abovementioned solution.

SUMMARY

The present disclosure relates to the technical field of information processing, and particularly to a method for uplink data transmission and a relevant device, which enable a terminal side to ensure the transmission efficiency on an uplink licensed resource.

In a first aspect, there is provided a method for uplink data transmission. The method is applied to a terminal device and includes the following operations.

First signaling sent by a network side is received, the first signaling being configured to allocate an uplink licensed resource to the terminal device.

Data of a first LCH is multiplexed to the uplink licensed resource allocated through the first signaling for transmission.

In a second aspect, there is provided a method for uplink data transmission. The method is applied to a network device and includes the following operation.

First signaling is sent to a terminal device, the first signaling being configured to allocate an uplink licensed resource to the terminal device.

In a third aspect, there is provided a terminal device. The terminal device includes a first communication unit and a first processing unit.

The first communication unit is configured to receive first signaling which is sent by a network side, the first signaling being configured to allocate an uplink licensed resource to the terminal device.

The first processing unit is configured to multiplex data of a first LCH to the uplink licensed resource allocated through the first signaling for transmission.

In a fourth aspect, there is provided a network device. The network device includes a second communication unit.

The second communication unit is configured to send first signaling to a terminal device, the first signaling being configured to allocate an uplink licensed resource to the terminal device.

In a fifth aspect, there is provided a terminal device, which may include a processor and a memory. The memory may be configured to store a computer program, and the processor may be configured to call and run the computer program stored in the memory to execute the method in the first aspect or each implementation mode thereof.

In a sixth aspect, there is provided a network device, which may include a processor and a memory. The memory may be configured to store a computer program, and the processor may be configured to call and run the computer program stored in the memory to execute the method in the second aspect or each implementation mode thereof.

In a seventh aspect, there is provided a chip, which is configured to implement the method in any aspect of the first aspect to the second aspect or each implementation mode thereof.

Specifically, the chip includes a processor, which is configured to call and run a computer program in a memory to enable a device installed with the chip to execute the method in any aspect of the first aspect to the second aspect or each implementation mode thereof.

In an eighth aspect, there is provided a computer-readable storage medium, which is configured to store a computer program, the computer program enabling a computer to execute the method in any aspect of the first aspect to the second aspect or each implementation mode thereof.

In a ninth aspect, there is provided a computer program product, which includes computer program instructions, the computer program instructions enabling a computer to execute the method in any aspect of the first aspect to the second aspect or each implementation mode thereof.

In a tenth aspect, there is provided a computer program, which runs on a computer to enable the computer to execute the method in any aspect of the first aspect to the second aspect or each implementation mode thereof.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
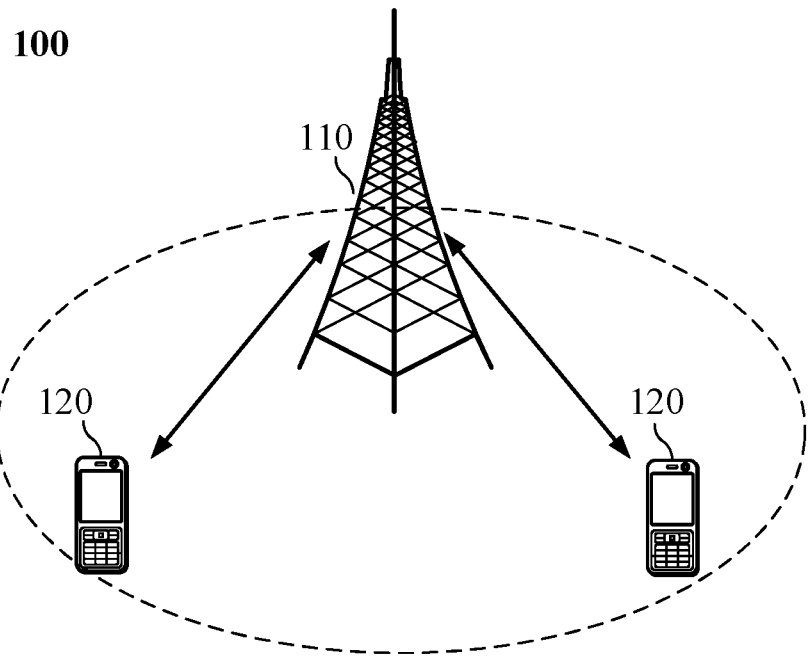
FIG. 1 is a first schematic diagram of an architecture of a communication system according to an embodiment of the present disclosure.

Exemplarily, a communication system 100 that the embodiments of the present disclosure are applied to may be illustrated in FIG. 1. The communication system 100 may include a network device 110, and the network device 110 may be a device communicating with a terminal device 120 (or called a communication terminal and a terminal). The network device 110 may provide communication coverage for a specific geographical region and may communicate with a terminal device located in the coverage region. Optionally, the network device 110 may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Or the network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 located within the coverage of the network device 110. A "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or an apparatus, arranged to receive/send communication signals, of another terminal device, and/or an Internet of Things (IoT) device. The terminal device arranged to communicate through a wireless interface may be called a "wireless communication terminal", a "wireless terminal" or a "mobile terminal." Examples of a mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal device 120 may perform Device to Device (D2D) communication.

Optionally, the 5G system or the 5G network may also be called an NR system or an NR network.

One network device and two terminal devices are exemplarily illustrated in FIG. 1. Optionally, the communication system 100 may include a plurality of network devices, and another number of terminal devices may be included in coverage of each network device. There are no limits made thereto in the embodiments of the present disclosure.

Optionally, the communication system 100 may further include another network entity such as a network controller and a mobility management entity. There are no limits made thereto in the embodiments of the present disclosure.

It is to be understood that a device with a communication function in the network/system in the embodiments of the present disclosure may be called a communication device. Taking the communication system 100 illustrated in FIG. 1 for an example, communication devices may include the network device 110 and terminal device 120 with the communication function. The network device 110 and the terminal device 120 may be the specific devices mentioned above and will not be elaborated herein. The communication devices may further include other devices in the communication system 100, for example, other network entities like a network controller and a mobility management entity. There are no limits made thereto in the embodiments of the present disclosure.

It is to be understood that terms "system" and "network" in the present disclosure may usually be exchanged in the present disclosure. In the present disclosure, term "and/or" is only an association relationship describing associated objects and represents that three relationships may exist. For example, A and/or B may represent three conditions: i.e., independent existence of A, existence of both A and B and independent existence of B. In addition, character "/" in the present disclosure usually represents that previous and next associated objects form an "or" relationship.

Figure 2:
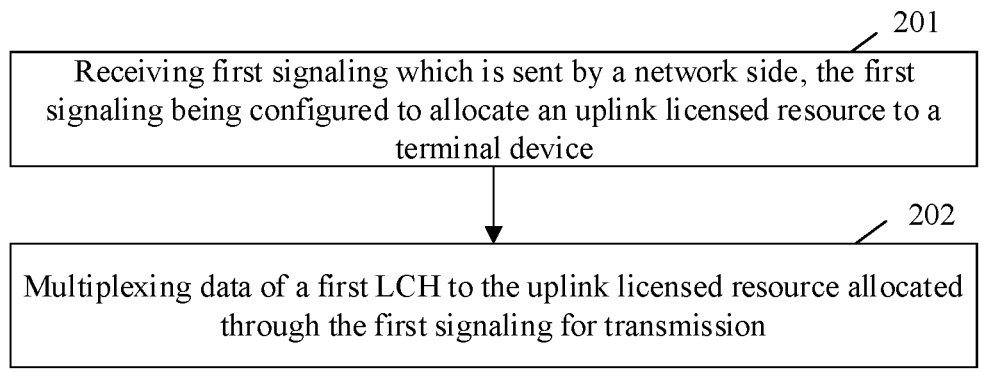
FIG. 2 is a schematic flowchart of a method for uplink data transmission according to an embodiment of the present disclosure.

FIG. 2 is a schematic flowchart of a method for uplink data transmission according to an embodiment of the present disclosure. The method is applied to a terminal device and includes the following operations.

At block 201, first signaling sent by a network side is received, the first signaling being configured to allocate an uplink licensed resource to the terminal device.

At block 202, data of a first LCH is multiplexed to the uplink licensed resource allocated through the first signaling for transmission.

With adoption of the solution, according to the received first signaling which is sent by the network side, the terminal multiplexes the data of the first LCH to the uplink licensed resource indicated/configured by the first signaling.

The embodiment may include the following scenarios, which are specifically described as follows.

A First Scenario

A Physical Downlink Control Channel (PDCCH) is scrambled through a first Radio Network Temporary Identifier (RNTI), to acquire, through the PDCCH, a service type feature corresponding to the uplink licensed resource configured by the network side.

Specifically, the operation that the first signaling sent by the network side is received includes the following operations.

The PDCCH which is scrambled through the first RNTI and is sent by the network side is received. The uplink licensed resource allocated by the network side is acquired from Downlink Control Information (DCI) carried in the PDCCH.

The first RNTI is another RNTI except a Cell-RNTI (C-RNTI) and a Configured Scheduling RNTI (SC-RNTI). It is to be pointed out that the first RNTI refers to an RNTI which is different from all RNTIs defined in a conventional art. That is, the PDCCH is scrambled through the first RNTI to enable a receiver, i.e., the terminal device, to determine that a presently received activation instruction is different from an instruction carried in a PDCCH scrambled through other RNTIs. Furthermore, the first RNTI may also be adopted to distinguish Modulation and Coding Scheme (MCS) tables.

The first RNTI may be configured to indicate a first MCS table. The first MCS table may be a 64 Quadrature Amplitude Modulation (QAM) MCS table, and may include at least one MCS. Moreover, the first MCS table may indicate an MCS different from that indicated by another MCS table in the conventional art, and is mainly configured to transmit a service with a relatively high requirement on reliability. When the terminal receives a PDCCH and if the PDCCH is scrambled through the first RNTI, an MCS type selected by the terminal may be selected from the first MCS table.

In addition, the first RNTI may also correspond to a first service type feature. The first service type feature corresponding to the first RNTI is configured by the network.

Furthermore, a first service type includes a delay, reliability and the like. Correspondingly, the first service type feature may be understood as a specific numerical value or specific definition corresponding to a parameter such as the delay and the reliability.

The method further includes that: responsive to that the first service type feature is the reliability, a reliability level corresponding to an MCS is determined based on the MCS in the DCI which is carried in the PDCCH scrambled through the first RNTI.

An indication manner for the MCS in the DCI may be carrying identification information of the MCS in the DCI. That is, the reliability level indicated by the network side is determined through a corresponding list of identification information of an MCS and a preset MCS reliability level.

Before the abovementioned processing is executed, the terminal device may further acquire different reliability levels corresponding to different MCSs.

That is, when the first service type feature is the reliability, the MCS in the DCI carried in the PDCCH scrambled through the first RNTI may be configured, and the reliability level corresponding to the MCS indicated in the DCI may be determined based on the following table. For example:

| MCS Identification Information (Index) Imcs | Reliability Level |
| --- | --- |
| 0 <= Imcs < 4 | High |
| 4 <= Imcs < 6 | Medium |
| 16 <= Imcs < 28 | Low |

Based on the table, if the first information is the PDCCH scrambled through the first RNTI, the identification information of the MCS acquired from the DCI in the PDCCH is 7, and the corresponding reliability level is "medium". That is, the uplink licensed resource corresponds to the reliability level 7.

There is another manner. When the first service type feature is the reliability, the reliability level allocated by the network side is acquired based on an information bit field of the reliability level in the DCI which is carried in the PDCCH scrambled through the first RNTI.

That is, a specific information bit field is set in the DCI, and the information bit field is configured to set the reliability level which is indicated to the terminal device by the network device. That is, when the first service type feature is the reliability, the DCI carried in the PDCCH scrambled through the first RNTI may also be configured to carry the information bit field indicating the reliability level.

In the scenario, the terminal device may further pre-acquire a preset service type feature which is configured by the network side for each of at least one LCH. Specifically, different levels of preset service type features are configured. That is, in the at least one LCH in the terminal device, the same preset service type feature may be configured for different LCHs, or different service type features may be configured for different LCHs.

The operation that the data of the first LCH is multiplexed to the uplink licensed resource corresponding to the first signaling for transmission includes the following operation.

Responsive to that a preset service type feature of the first LCH in the at least one LCH of the terminal device meets the first service type feature which is allocated through the first signaling sent by the network side, the data of the first LCH is transmitted on the uplink licensed resource which is allocated through the first signaling. That is, when the preset service type feature configured for the first LCH meets a service type feature level corresponding to the first signaling, the data of the first LCH may be transmitted on the uplink licensed resource indicated by the first signaling. In addition, if the preset service type feature configured for the first LCH does not meet the first service type feature corresponding to the first signaling, the data of the first LCH may not be transmitted on the uplink licensed resource.

The condition of meeting may refer to that the preset service type feature of the first LCH is the same as the first service type feature allocated through the first signaling. For example, if the preset service type feature of the first LCH is that the reliability level is medium and the first service type feature of the uplink licensed resource allocated through the first signaling is that the reliability level is high, the preset service type feature does not meet the first service type feature. If the preset service type feature of the first LCH is that the reliability level is high and the first service type feature of the uplink licensed resource allocated through the first signaling is that the reliability level is high, it is determined that the preset service type feature meets the first service type feature, and the data of the first LCH may be transmitted on the uplink licensed resource.

A Second Scenario

A PDCCH is scrambled through a first RNTI, to acquire, through the PDCCH, a service type feature corresponding to the uplink licensed resource configured by the network side.

Specifically, the operation that the first signaling sent by the network side is received includes the following operations.

The PDCCH which is scrambled through the first RNTI and is sent by the network side is received. The uplink licensed resource allocated by the network side is acquired from DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH is scrambled through the first RNTI to enable a receiver, i.e., the terminal device, to determine that a presently received activation instruction is different from an instruction carried in a PDCCH scrambled through other RNTIs. Furthermore, the first RNTI may also be adopted to distinguish MCS tables.

The first RNTI may be configured to indicate a first MCS table. The first MCS table may include at least one MCS. Moreover, the first MCS table may indicate an MCS different from that indicated by another MCS table in the conventional art, and for example, may correspond to higher service reliability.

The method further includes that: first indication information is configured for at least one LCH of the terminal device, the first indication information being configured to indicate whether the LCH corresponds to an indication field of the first RNTI.

It is to be noted that different LCHs may correspond to the same or different first indication information. The LCH is configured with an indication about whether the LCH corresponds to the indication field of the first RNTI, for example, a bit 0/1, 1 indicating that transmission of the LCH on the uplink licensed resource indicated by the PDCCH scrambled through the first RNTI is allowed and 0 indicating that transmission is not allowed. Of course, information indicated by 0 and 1 may be exchanged. Or other numerical values may be adopted for indication. Exhaustions are omitted in the embodiment.

The operation that the data of the first LCH is multiplexed to the uplink licensed resource corresponding to the first signaling for transmission includes the following operation.

Responsive to that the uplink licensed resource allocated by the PDCCH scrambled through the first RNTI is received, whether transmission of the first LCH on the uplink licensed resource is allowed is determined based on the first indication information of the first LCH. Responsive to that transmission of the first LCH on the uplink licensed resource is allowed, the data of the first LCH is multiplexed to the uplink licensed resource, and the data of the first LCH is transmitted on the uplink licensed resource.

The operation that the data of the first LCH is multiplexed to the uplink licensed resource for transmission includes that: the data of the first LCH is multiplexed to the uplink licensed resource for transmission according to an LCP rule.

For example, when the uplink licensed resource indicated by the PDCCH scrambled through the first RNTI is received, whether transmission of the first LCH on the uplink licensed resource is allowed is determined. If transmission of the first LCH on the uplink licensed resource is allowed, the data of the LCH is multiplexed to the resource according to the LCP rule.

The LCP rule may be that, when UE obtains an uplink resource grant, the UE may allocate a licensed resource to different LCHs according to a specified LCP process.

A Third Scenario

The first signaling is RRC signaling, and the network side configures a first-type uplink semi-static licensed resource or a second-type uplink semi-static licensed resource for the terminal device through the RRC signaling.

The first-type uplink semi-static licensed resource is an uplink semi-static licensed resource configured by RRC. The second-type uplink semi-static licensed resource is an uplink semi-static licensed resource configured by RRC, and is a resource activated and deactivated through DCI. The second-type uplink semi-static licensed resource may be understood as a semi-static licensed resource of which a cycle is configured by RRC and a frequency domain is configured through the DCI, and which is activated or deactivated through the DCI.

The first signaling is configured to indicate that an MCS table is a first MCS table. That is, the first signaling is the RRC signaling and indicates that the MCS table is the first MCS table.

The first signaling is further configured to configure the first-type uplink semi-static licensed resource or configure the second-type uplink semi-static licensed resource.

The method further includes that: second indication information is configured for at least one LCH of the terminal device, the second indication information being configured to indicate whether transmission on the first-type licensed resource or second-type licensed resource, which corresponds to the first MCS table, is allowed.

That is, the network side may further configure the same or different second indication information for the at least one LCH of the terminal device respectively. Whether the LCH corresponds to the first MCS table is indicated through the second indication information, for example, a bit 0/1, 1 indicating that transmission of the LCH on the first or second-type licensed resource configured through the first signaling is allowed, otherwise transmission is not allowed. Of course, another configuration manner may also be adopted but exhaustions are omitted in the embodiment.

The operation that the data of the first LCH is multiplexed to the uplink licensed resource corresponding to the first signaling for transmission includes that: responsive to that the RRC signaling is received, whether transmission of the first LCH on the first-type uplink semi-static licensed resource or the second-type uplink semi-static licensed resource is allowed is determined based on a data state of the terminal device and the second indication information of the first LCH; and responsive to that transmission of the first LCH on the first-type uplink semi-static licensed resource or the second-type uplink semi-static licensed resource is allowed, the data of the first LCH is multiplexed to the first-type uplink semi-static licensed resource or the second-type uplink semi-static licensed resource for transmission.

The operation that the data of the first LCH is multiplexed to the first-type uplink semi-static licensed resource or the second-type uplink semi-static licensed resource for transmission includes that: the data of the first LCH is multiplexed to the first-type uplink semi-static licensed resource or the second-type uplink semi-static licensed resource for transmission according to the LCP rule.

That is, when the RRC signaling is received, whether transmission of the first LCH on the configured resource is allowed is simultaneously determined according to the data state of the terminal, and if transmission of the first LCH on the configured resource is allowed, the data of the LCH is multiplexed to the resource according to the LCP rule. The data state of the terminal may be understood as a data transmission state of the terminal. For example, when the terminal is presently in a state of transmitting data, whether data transmission on the corresponding uplink semi-static licensed resource is allowed may be determined based on the second indication information of the first LCH. If data transmission on the corresponding uplink semi-static licensed resource is allowed, data transmission is performed on the corresponding uplink semi-static licensed resource. When the terminal is in a state of not transmitting data, subsequent determination is not performed.

It can be seen that, with adoption of the solution, based on the first signaling sent by the network side, data transmission of the first LCH is determined to be performed on the uplink licensed resource allocated in the first signaling. In such a manner, the transmission efficiency of the terminal device on the uplink licensed resource can be ensured.

In addition, in the embodiment of the present disclosure, the service type feature corresponding to the first LCH may correspond to an attribute such as the reliability and the delay, so that it can be ensured that a matched uplink licensed resource is adopted for transmission of the first LCH.

In an embodiment of the present disclosure, there is provided a method for uplink data transmission, which is applied to a network device. The method includes the following operation.

First signaling is sent to a terminal device, the first signaling being configured to allocate an uplink licensed resource to the terminal device.

With adoption of the solution, the terminal multiplexes data of a first LCH to the uplink licensed resource indicated/configured by the first signaling through the received first signaling sent by a network side.

The embodiment may include the following scenarios, which are specifically described as follows.

A First Scenario

A PDCCH is scrambled through a first RNTI, to acquire, through the PDCCH, a service type feature corresponding to the uplink licensed resource configured by the network side.

Specifically, the operation that the first signaling is sent to the terminal device includes the following operations.

The PDCCH is scrambled through the first RNTI. The uplink licensed resource is allocated to the terminal device through DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH may be scrambled through the first RNTI to enable a receiver, i.e., the terminal device, to determine that a presently received activation instruction is different from an instruction carried in a PDCCH scrambled through other RNTIs. Furthermore, the first RNTI may also be adopted to distinguish MCS tables.

The first RNTI may be configured to indicate a first MCS table. The first MCS table may be a 64 QAM MCS table, and may include at least one MCS. Moreover, the first MCS table may indicate an MCS different from that indicated by another MCS table in the conventional art, and is mainly configured to transmit a service with a relatively high requirement on reliability. When the terminal receives a PDCCH and if the PDCCH is scrambled through the first RNTI, an MCS type selected by the terminal may be selected from the first MCS table.

In addition, the first RNTI may also correspond to a first service type feature. The first service type feature corresponding to the first RNTI is configured by the network.

Furthermore, a first service type includes a delay, reliability and the like. Correspondingly, the first service type feature may be understood as a specific numerical value or specific definition corresponding to a parameter such as the delay and the reliability.

The method further includes that: responsive to that the first service type feature is reliability, a reliability level configured by the network side is indicated to the terminal device based on an MCS in the DCI which is carried in the PDCCH scrambled through the first RNTI.

An indication manner for the MCS in the DCI may be carrying identification information of the MCS in the DCI. That is, the reliability level indicated by the network side is determined through a corresponding list of identification information of an MCS and a preset MCS reliability level.

Before the abovementioned processing is executed, the terminal device may further acquire different reliability levels corresponding to different MCSs.

That is, when the first service type feature is the reliability, the MCS in the DCI carried in the PDCCH scrambled through the first RNTI may be configured, and the reliability level corresponding to the MCS indicated in the DCI may be determined based on the following table. For example:

| MCS Identification Information (Index) Imcs | Reliability Level |
| --- | --- |
| 0 <= Imcs < 4 | High |
| 4 <= Imcs < 16 | Medium |
| 16 <= Imcs < 28 | Low |

Based on the table, if the first information is the PDCCH scrambled through the first RNTI, the identification information of the MCS acquired from the DCI in the PDCCH is 7, and the corresponding reliability level is "medium". That is, the uplink licensed resource corresponds to the reliability level 7.

There is another manner. When the first service type feature is the reliability, the reliability level configured by the network side is indicated to the terminal device based on an information bit field of the reliability level in the DCI which is carried in the PDCCH scrambled through the first RNTI.

That is, a specific information bit field is set in the DCI, and the information bit field is configured to set the reliability level which is indicated to the terminal device by the network device. That is, when the first service type feature is the reliability, the DCI carried in the PDCCH scrambled through the first RNTI may also be configured to carry the information bit field indicating the reliability level.

In the scenario, the terminal device may further pre-acquire a preset service type feature which is configured by the network side for each of at least one LCH. Specifically, different levels of preset service type features are configured. That is, in the at least one LCH in the terminal device, the same preset service type feature may be configured for different LCHs, or different service type features may be configured for different LCHs.

When the preset service type feature configured for the first LCH meets a service type feature level corresponding to the first signaling, the data of the first LCH may be transmitted on the uplink licensed resource indicated by the first signaling. In addition, if the preset service type feature configured for the first LCH does not meet the first service type feature level corresponding to the first signaling, the data of the first LCH may not be transmitted on the uplink licensed resource.

The condition of meeting may refer to that the preset service type feature of the first LCH is the same as the first service type feature allocated through the first signaling. For example, if the preset service type feature of the first LCH is that the reliability level is medium and the first service type feature of the uplink licensed resource allocated through the first signaling is that the reliability level is high, the preset service type feature does not meet the first service type feature. If the preset service type feature of the first LCH is that the reliability level is high and the first service type feature of the uplink licensed resource allocated through the first signaling is that the reliability level is high, it is determined that the preset service type feature meets the first service type feature, and the data of the first LCH may be transmitted on the uplink licensed resource.

A Second Scenario

A PDCCH is scrambled through a first RNTI, to acquire, through the PDCCH, a service type feature corresponding to the uplink licensed resource configured by the network side.

Specifically, the PDCCH scrambled through the first RNTI is sent to the terminal device. The uplink licensed resource allocated by the network side is acquired from DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH may be scrambled through the first RNTI to enable a receiver, i.e., the terminal device, to determine that a presently received activation instruction is different from an instruction carried in a PDCCH scrambled through another RNTI. Furthermore, the first RNTI may also be adopted to distinguish MCS tables.

The first RNTI may be configured to indicate a first MCS table. The first MCS table may include at least one MCS. Moreover, the first MCS table may indicate an MCS different from that indicated by another MCS table in the conventional art, and for example, may correspond to higher service reliability.

The method further includes that: first indication information is configured for at least one LCH of the terminal device, the first indication information being configured to indicate whether the LCH corresponds to an indication field of the first RNTI.

It is to be noted that different LCHs may correspond to the same or different first indication information. The LCH is configured with an indication about whether the LCH corresponds to the indication field of the first RNTI, for example, a bit 0/1, 1 indicating that transmission of the LCH on the uplink licensed resource indicated by the PDCCH scrambled through the first RNTI is allowed and 0 indicating that transmission is not allowed. Of course, information indicated by 0 and 1 may be exchanged. Or other numerical values may be adopted for indication. Exhaustions are omitted in the embodiment.

When the terminal device receives the uplink licensed resource which is indicated by the PDCCH scrambled through the first RNTI, whether transmission of the first LCH on the uplink licensed resource is allowed is determined. If transmission of the first LCH on the uplink licensed resource is allowed, the data of the LCH is multiplexed to the resource according to the LCP rule.

The LCP rule may be that, when UE obtains an uplink resource grant, the UE may allocate a licensed resource to different LCHs according to a specified LCP process.

A Third Scenario

The first signaling is RRC signaling, and the network side configures a first-type uplink semi-static licensed resource or a second-type uplink semi-static licensed resource for the terminal device through the RRC signaling.

The first signaling is configured to indicate that an MCS table is a first MCS table. That is, the first signaling is the RRC signaling and indicates that the MCS table is the first MCS table.

The first signaling is further configured to configure the first-type uplink semi-static licensed resource or configure the second-type uplink semi-static licensed resource.

The first-type uplink semi-static licensed resource is an uplink semi-static licensed resource configured by RRC. The second-type uplink semi-static licensed resource is an uplink semi-static licensed resource configured by RRC, and is a resource activated and deactivated through DCI. The second-type uplink semi-static licensed resource may be understood as a semi-static licensed resource of which a cycle is configured by RRC and a frequency domain is configured through the DCI, and which is activated or deactivated through the DCI.

Second indication information is configured for at least one LCH of the terminal device, the second indication information being configured to indicate whether transmission on the first-type licensed resource or second-type licensed resource, which corresponds to the first MCS table, is allowed.

That is, the network side may further configure the same or different second indication information for the at least one LCH of the terminal device respectively. Whether the LCH corresponds to the indication field of the first MCS table is indicated through the second indication information, for example, a bit 0/1, 1 indicating that transmission of the LCH on the first or second-type licensed resource configured through the first signaling is allowed, otherwise transmission is not allowed. Of course, another configuration manner may also be adopted but exhaustions are omitted in the embodiment.

When the terminal device receives the RRC signaling, whether transmission of the first LCH on the configured resource is allowed is simultaneously determined according to the data state of the terminal. If transmission of the first LCH on the configured resource is allowed, the data of the LCH is multiplexed to the resource according to the LCP rule. The data state of the terminal may be understood as a data transmission state of the terminal. For example, when the terminal is presently in a state of transmitting data, whether data transmission on the corresponding uplink semi-static licensed resource is allowed may be determined based on the second indication information of the first LCH, and if data transmission on the corresponding uplink semi-static licensed resource is allowed, data transmission is performed on the corresponding uplink semi-static licensed resource. When the terminal is in a state of not transmitting data, subsequent determination is not performed.

It can be seen that, with adoption of the solution, data transmission of the first LCH is determined to be performed on the uplink licensed resource allocated in the first signaling based on the first signaling sent by the network side. In such a manner, the transmission efficiency of the terminal device on the uplink licensed resource can be ensured.

In addition, in the embodiment of the present disclosure, the service type feature corresponding to the first LCH may correspond to an attribute such as the reliability and the delay, so that it may be ensured that a matched uplink licensed resource is adopted for transmission of the first LCH.

Figure 3:
FIG. 3 is a schematic diagram of composition structure of a terminal device according to an embodiment of the present disclosure.

FIG. 3 illustrates a terminal device according to an embodiment of the present disclosure. The terminal device includes a first communication unit 31 and a first processing unit 32.

The first communication unit 31 is configured to receive first signaling which is sent by a network side, the first signaling being configured to allocate an uplink licensed resource to the terminal device.

The first processing unit 32 is configured to multiplex data of a first LCH to the uplink licensed resource allocated through the first signaling for transmission.

With adoption of the solution, the terminal multiplexes the data of the first LCH to the uplink licensed resource indicated/configured by the first signaling through the received first signaling sent by the network side.

The embodiment may include the following scenarios, which are specifically described as follows.

A First Scenario

A PDCCH is scrambled through a first RNTI, to acquire, through the PDCCH, a service type feature corresponding to the uplink licensed resource configured by the network side.

Specifically, the first communication unit 31 is configured to receive the PDCCH which is scrambled through the first RNTI and is sent by the network side. The first processing unit 32 is configured to acquire the uplink licensed resource allocated by the network side from DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH may be scrambled through the first RNTI to enable a receiver, i.e., the terminal device, to determine that a presently received activation instruction is different from an instruction carried in a PDCCH scrambled through another RNTI. Furthermore, the first RNTI may also be adopted to distinguish MCS tables.

The first RNTI may be configured to indicate a first MCS table. The first MCS table may be a 64 QAM MCS table, and may include at least one MCS. Moreover, the first MCS table may indicate an MCS different from that indicated by another MCS table in the conventional art, and is mainly configured to transmit a service with a relatively high requirement on reliability. When the terminal receives a PDCCH and if the PDCCH is scrambled through the first RNTI, an MCS type selected by the terminal may be selected from the first MCS table.

In addition, the first RNTI may also correspond to a first service type feature. The first service type feature corresponding to the first RNTI is configured by the network.

Furthermore, a first service type includes a delay, reliability and the like. Correspondingly, the first service type feature may be understood as a specific numerical value or specific definition corresponding to a parameter such as the delay and the reliability.

The first processing unit 32 is configured to, responsive to that the first service type feature is the reliability, determine a reliability level corresponding to an MCS based on the MCS in the DCI which is carried in the PDCCH scrambled through the first RNTI.

An indication manner for the MCS in the DCI may be carrying identification information of the MCS in the DCI. That is, the reliability level indicated by the network side is determined through a corresponding list of identification information of an MCS and a preset MCS reliability level.

Before the abovementioned processing is executed, the terminal device may further acquire different reliability levels corresponding to different MCSs.

That is, when the first service type feature is the reliability, the MCS in the DCI carried in the PDCCH scrambled through the first RNTI may be configured, and the reliability level corresponding to the MCS indicated in the DCI may be determined based on the following table. For example:

| MCS Identification Information (Index) Imcs | Reliability Level |
| --- | --- |
| 0 <= Imcs < 4 | High |
| 4 <= Imcs < 16 | Medium |
| 16 <= Imcs < 28 | Low |

Based on the table, if the first information is the PDCCH scrambled through the first RNTI, the identification information of the MCS acquired from the DCI in the PDCCH is 7, and the corresponding reliability level is "medium". That is, the uplink licensed resource corresponds to the reliability level 7.

There is another manner. When the first service type feature is the reliability, the reliability level allocated by the network side is acquired based on an information bit field of the reliability level in the DCI which is carried in the PDCCH scrambled through the first RNTI.

That is, a specific information bit field is set in the DCI, and the information bit field is configured to set the reliability level which is indicated to the terminal device by the network device. That is, when the first service type feature is the reliability, the DCI carried in the PDCCH scrambled through the first RNTI may also be configured to carry the information bit field indicating the reliability level.

In the scenario, the terminal device may further pre-acquire a preset service type feature which is configured by the network side for each of at least one LCH. Specifically, different levels of preset service type features are configured. That is, in the at least one LCH in the terminal device, the same preset service type feature may be configured for different LCHs, or different service type features may be configured for different LCHs.

The first processing unit 32 is configured to, responsive to that a preset service type feature of the first LCH in the at least one LCH meets the first service type feature which is allocated through the first signaling sent by the network side, transmit the data of the first LCH on the uplink licensed resource which is allocated through the first signaling. That is, when the preset service type feature configured for the first LCH meets a service type feature level corresponding to the first signaling, the data of the first LCH may be transmitted on the uplink licensed resource indicated by the first signaling. In addition, if the preset service type feature configured for the first LCH does not meet the first service type feature level corresponding to the first signaling, the data of the first LCH may not be transmitted on the uplink licensed resource.

The condition of meeting may refer to that the preset service type feature of the first LCH is the same as the first service type feature allocated through the first signaling. For example, if the preset service type feature of the first LCH is that the reliability level is medium and the first service type feature of the uplink licensed resource allocated through the first signaling is that the reliability level is high, the preset service type feature does not meet the first service type feature. If the preset service type feature of the first LCH is that the reliability level is high and the first service type feature of the uplink licensed resource allocated through the first signaling is that the reliability level is high, it is determined that the preset service type feature meets the first service type feature, and the data of the first LCH may be transmitted on the uplink licensed resource.

A Second Scenario

A PDCCH is scrambled through a first RNTI, to acquire, through the PDCCH, a service type feature corresponding to the uplink licensed resource configured by the network side.

Specifically, the first communication unit 31 is configured to receive the PDCCH which is scrambled through the first RNTI and is sent by the network side, and acquire the uplink licensed resource allocated by the network side from DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH may be scrambled through the first RNTI to enable a receiver, i.e., the terminal device, to determine that a presently received activation instruction is different from an instruction carried in a PDCCH scrambled through another RNTI. Furthermore, the first RNTI may also be adopted to distinguish MCS tables.

The first RNTI may be configured to indicate a first MCS table. The first MCS table may include at least one MCS. Moreover, the first MCS table may indicate an MCS different from that indicated by another MCS table in the conventional art, and for example, may correspond to higher service reliability.

The first processing unit 32 is configured to configure first indication information for at least one LCH of the terminal device, the first indication information being configured to indicate whether the LCH corresponds to an indication field of the first RNTI.

It is to be noted that different LCHs may correspond to the same or different first indication information. The LCH is configured with an indication about whether the LCH corresponds to the indication field of the first RNTI, for example, a bit 0/1, 1 indicating that transmission of the LCH on the uplink licensed resource indicated by the PDCCH scrambled through the first RNTI is allowed and 0 indicating that transmission is not allowed. Of course, information indicated by 0 and 1 may be exchanged. Or other numerical values may be adopted for indication. Exhaustions are omitted in the embodiment.

The first processing unit 32 is configured to, responsive to that the uplink licensed resource allocated by the PDCCH scrambled through the first RNTI is received, determine whether transmission of the first LCH on the uplink licensed resource is allowed based on the first indication information of the first LCH, and responsive to that transmission of the first LCH on the uplink licensed resource is allowed, multiplex the data of the first LCH to the uplink licensed resource for transmission.

The first processing unit 32 is configured to multiplex the data of the first LCH to the uplink licensed resource for transmission according to an LCP rule.

For example, when the uplink licensed resource indicated by the PDCCH scrambled through the first RNTI is received, whether transmission of the first LCH on the uplink licensed resource is allowed is determined. If transmission of the first LCH on the uplink licensed resource is allowed, the data of the LCH is multiplexed to the resource according to the LCP rule.

The LCP rule may be that, when UE obtains an uplink resource grant, the UE may allocate a licensed resource to different LCHs according to a specified LCP process.

A Third Scenario

The first signaling is RRC signaling, and the network side configures a first-type uplink semi-static licensed resource or a second-type uplink semi-static licensed resource for the terminal device through the RRC signaling.

The first signaling is configured to indicate that an MCS table is a first MCS table. That is, the first signaling is the RRC signaling and indicates that the MCS table is the first MCS table.

The first signaling is further configured to configure the first-type uplink semi-static licensed resource or configure the second-type uplink semi-static licensed resource.

The first-type uplink semi-static licensed resource is an uplink semi-static licensed resource configured by RRC. The second-type uplink semi-static licensed resource is an uplink semi-static licensed resource configured by RRC, and is a resource activated and deactivated through DCI. The second-type uplink semi-static licensed resource may be understood as a semi-static licensed resource of which a cycle is configured by RRC and a frequency domain is configured through the DCI, and which is activated or deactivated through the DCI.

The first processing unit 32 is configured to configure second indication information for at least one LCH, the second indication information being configured to indicate whether transmission on the first-type licensed resource or second-type licensed resource, which corresponds to the first MCS table, is allowed.

That is, the network side may further configure the same or different second indication information for the at least one LCH of the terminal device respectively. Whether the LCH corresponds to the indication field of the first MCS table is indicated through the second indication information, for example, a bit 0/1, 1 indicating that transmission of the LCH on the first or second-type licensed resource configured through the first signaling is allowed, otherwise transmission is not allowed. Of course, another configuration manner may also be adopted but exhaustions are omitted in the embodiment.

The first processing unit 32 is configured to, responsive to that the first signaling is received, determine, based on a data state of the terminal device and the second indication information of the first LCH, whether transmission of the first LCH on the first-type uplink semi-static licensed resource or the second-type uplink semi-static licensed resource is allowed, and responsive to that transmission of the first LCH on the first-type uplink semi-static licensed resource or the second-type uplink semi-static licensed resource is allowed, multiplex the data of the first LCH to the first-type uplink semi-static licensed resource or the second-type uplink semi-static licensed resource for transmission.

The first processing unit 32 is configured to multiplex the data of the first LCH to the first-type uplink semi-static licensed resource or the second-type uplink semi-static licensed resource for transmission according to an LCP rule.

That is, when the RRC signaling is received, whether transmission of the first LCH on the configured resource is allowed is simultaneously determined according to the data state of the terminal. If transmission of the first LCH on the configured resource is allowed, the data of the LCH is multiplexed to the resource according to the LCP rule. The data state of the terminal may be understood as a data transmission state of the terminal. For example, when the terminal is presently in a state of transmitting data, whether data transmission on the corresponding uplink semi-static licensed resource is allowed may be determined based on the second indication information of the first LCH. If data transmission on the corresponding uplink semi-static licensed resource is allowed, data transmission is performed on the corresponding uplink semi-static licensed resource. When the terminal is in a state of not transmitting data, subsequent determination is not performed.

It can be seen that, with adoption of the solution, data transmission of the first LCH is determined to be performed on the uplink licensed resource allocated in the first signaling based on the first signaling sent by the network side. In such a manner, the transmission efficiency of the terminal device on the uplink licensed resource can be ensured.

In addition, in the embodiment of the present disclosure, the service type feature corresponding to the first LCH may correspond to an attribute such as the reliability and the delay, so that it can be ensured that a matched uplink licensed resource is adopted for transmission of the first LCH.

In an embodiment of the present disclosure, there is provided a network device. The network device includes a second communication unit.

The second communication unit is configured to send first signaling to a terminal device, the first signaling being configured to allocate an uplink licensed resource to the terminal device.

With adoption of the solution, the terminal multiplexes data of a first LCH to the uplink licensed resource indicated/configured by the first signaling through the received first signaling sent by a network side.

The embodiment may include the following scenarios, which are specifically described as follows.

A First Scenario

A PDCCH is scrambled through a first RNTI, to acquire, through the PDCCH, a service type feature corresponding to the uplink licensed resource configured by the network side.

Specifically, the second communication unit is configured to scramble the PDCCH through the first RNTI and allocate the uplink licensed resource to the terminal device through DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH may be scrambled through the first RNTI to enable a receiver, i.e., the terminal device, to determine that a presently received activation instruction is different from an instruction carried in a PDCCH scrambled through another RNTI. Furthermore, the first RNTI may also be adopted to distinguish MCS tables.

The first RNTI may be configured to indicate a first MCS table. The first MCS table may be a 64 QAM MCS table, and may include at least one MCS. Moreover, the first MCS table may indicate an MCS different from that indicated by another MCS table in the conventional art, and is mainly configured to transmit a service with a relatively high requirement on reliability. When the terminal receives a PDCCH and if the PDCCH is scrambled through the first RNTI, an MCS type selected by the terminal may be selected from the first MCS table.

In addition, the first RNTI may also correspond to a first service type feature. The first service type feature corresponding to the first RNTI is configured by the network.

Furthermore, a first service type includes a delay, reliability and the like. Correspondingly, the first service type feature may be understood as a specific numerical value or specific definition corresponding to a parameter such as the delay and the reliability.

The second communication unit is configured to, responsive to that the first service type feature is reliability, indicate a reliability level configured by the network side to the terminal device based on an MCS in the DCI which is carried in the PDCCH scrambled through the first RNTI.

An indication manner for the MCS in the DCI may be carrying identification information of the MCS in the DCI. That is, the reliability level indicated by the network side is determined through a corresponding list of identification information of an MCS and a preset MCS reliability level.

Before the abovementioned processing is executed, the terminal device may further acquire different reliability levels corresponding to different MCSs.

That is, when the first service type feature is the reliability, the MCS in the DCI carried in the PDCCH scrambled through the first RNTI may be configured, and the reliability level corresponding to the MCS indicated in the DCI may be determined based on the following table. For example:

| MCS Identification Information (Index) Imcs | Reliability Level |
|---|---|
| 0 <= Imcs < 4 | High |
| 4 <= Imcs < 16 | Medium |
| 16 <= Imcs < 28 | Low |

Based on the table, if the first information is the PDCCH scrambled through the first RNTI, the identification information of the MCS acquired from the DCI in the PDCCH is 7, and the corresponding reliability level is "medium". That is, the uplink licensed resource corresponds to the reliability level 7.

There is another manner. When the first service type feature is the reliability, the reliability level configured by the network side is indicated to the terminal device based on an information bit field of the reliability level in the DCI which is carried in the PDCCH scrambled through the first RNTI.

That is, a specific information bit field is set in the DCI, and the information bit field is configured to set the reliability level which is indicated to the terminal device by the network device. That is, when the first service type feature is the reliability, the DCI carried in the PDCCH scrambled through the first RNTI may also be configured to carry the information bit field indicating the reliability level.

In the scenario, the terminal device may further pre-acquire a preset service type feature which is configured by the network side for each of at least one LCH. Specifically, different levels of preset service type features are configured. That is, in the at least one LCH in the terminal device, the same preset service type feature may be configured for different LCHs, or different service type features may be configured for different LCHs.

When the preset service type feature configured for the first LCH meets a service type feature level corresponding to the first signaling, the data of the first LCH may be transmitted on the uplink licensed resource indicated by the first signaling. In addition, if the preset service type feature configured for the first LCH does not meet the first service type feature level corresponding to the first signaling, the data of the first LCH may not be transmitted on the uplink licensed resource.

The condition of meeting may refer to that the preset service type feature of the first LCH is the same as the first service type feature allocated through the first signaling. For example, if the preset service type feature of the first LCH is that the reliability level is medium and the first service type feature of the uplink licensed resource allocated through the first signaling is that the reliability level is high, the preset service type feature does not meet the first service type feature. If the preset service type feature of the first LCH is that the reliability level is high and the first service type feature of the uplink licensed resource allocated through the first signaling is that the reliability level is high, it is determined that the preset service type feature meets the first service type feature, and the data of the first LCH may be transmitted on the uplink licensed resource.

A Second Scenario

A PDCCH is scrambled through a first RNTI, to acquire, through the PDCCH, a service type feature corresponding to the uplink licensed resource configured by the network side.

Specifically, the second communication unit is configured to send the PDCCH scrambled through the first RNTI to the terminal device and acquire the uplink licensed resource allocated by the network side from DCI carried in the PDCCH.

The first RNTI is another RNTI except a C-RNTI and a SC-RNTI. It is to be pointed out that the first RNTI refers to an RNTI which is different from all RNTIs defined in the conventional art. That is, the PDCCH may be scrambled through the first RNTI to enable a receiver, i.e., the terminal device, to determine that a presently received activation instruction is different from an instruction carried in a PDCCH scrambled through another RNTI. Furthermore, the first RNTI may also be adopted to distinguish MCS tables.

The first RNTI may be configured to indicate a first MCS table. The first MCS table may include at least one MCS. Moreover, the first MCS table may indicate an MCS different from that indicated by another MCS table in the conventional art, and for example, may correspond to higher service reliability.

The second communication unit is configured to configure first indication information for at least one LCH of the terminal device, the first indication information being configured to indicate whether the LCH corresponds to an indication field of the first RNTI.

It is to be noted that different LCHs may correspond to the same or different first indication information. The LCH is configured with an indication about whether the LCH corresponds to the indication field of the first RNTI, for example, a bit 0/1, 1 indicating that transmission of the LCH on the uplink licensed resource indicated by the PDCCH scrambled through the first RNTI is allowed and 0 indicating that transmission is not allowed. Of course, information indicated by 0 and 1 may be exchanged. Or other numerical values may be adopted for indication. Exhaustions are omitted in the embodiment.

When the terminal device receives the uplink licensed resource indicated by the PDCCH scrambled through the first RNTI, whether transmission of the first LCH on the uplink licensed resource is allowed is determined. If transmission of the first LCH on the uplink licensed resource is allowed, the data of the LCH is multiplexed to the resource according to the LCP rule.

The LCP rule may be that, when UE obtains an uplink resource grant, the UE may allocate a licensed resource to different LCHs according to a specified LCP process.

A Third Scenario

The first signaling is RRC signaling, and the network side configures a first-type uplink semi-static licensed resource or a second-type uplink semi-static licensed resource for the terminal device through the RRC signaling.

The first signaling is configured to indicate that an MCS table is a first MCS table. That is, the first signaling is the RRC signaling and indicates that the MCS table is the first MCS table.

The first signaling is further configured to configure the first-type uplink semi-static licensed resource or configure the second-type uplink semi-static licensed resource.

The first-type uplink semi-static licensed resource is an uplink semi-static licensed resource configured by RRC. The second-type uplink semi-static licensed resource is an uplink semi-static licensed resource configured by RRC, and is a resource activated and deactivated through DCI. The second-type uplink semi-static licensed resource may be understood as a semi-static licensed resource of which a cycle is configured by RRC and a frequency domain is configured through the DCI, and which is activated or deactivated through the DCI.

Second indication information is configured for at least one LCH of the terminal device, the second indication information being configured to indicate whether transmission on the first-type licensed resource or second-type licensed resource, which corresponds to the first MCS table, is allowed.

The second indication information is configured to indicate whether the LCH corresponds to the indication field of the first MCS table. A content included in the indication field of the first MCS table may be at least one MCS and uplink semi-static licensed resources of different types corresponding to different MCSs.

That is, the network side may further configure the same or different second indication information for the at least one LCH of the terminal device respectively. Whether the LCH corresponds to the indication field of the first MCS table is indicated through the second indication information, for example, a bit 0/1, 1 indicating that transmission of the LCH on the first or second-type licensed resource configured through the first signaling is allowed, otherwise transmission is not allowed. Of course, another configuration manner may also be adopted but exhaustions are omitted in the embodiment.

When the terminal device receives the RRC signaling, whether transmission of the first LCH on the configured resource is allowed is simultaneously determined according to the data state of the terminal. If transmission of the first LCH on the configured resource is allowed, the data of the LCH is multiplexed to the resource according to the LCP rule. The data state of the terminal may be understood as a data transmission state of the terminal. For example, when the terminal is presently in a state of transmitting data, whether data transmission on the corresponding uplink semi-static licensed resource is allowed may be determined based on the second indication information of the first LCH, and if data transmission on the corresponding uplink semi-static licensed resource is allowed, data transmission is performed on the corresponding uplink semi-static licensed resource. When the terminal is in a state of not transmitting data, subsequent determination is not performed.

It can be seen that, with adoption of the solution, data transmission of the first LCH is determined to be performed on the uplink licensed resource allocated in the first signaling based on the first signaling sent by the network side. In such a manner, the transmission efficiency of the terminal device on the uplink licensed resource can be ensured.

In addition, in the embodiment of the present disclosure, the service type feature corresponding to the first LCH may correspond to an attribute such as the reliability and the delay, so that it can be ensured that a matched uplink licensed resource is adopted for transmission of the first LCH.

Figure 4:
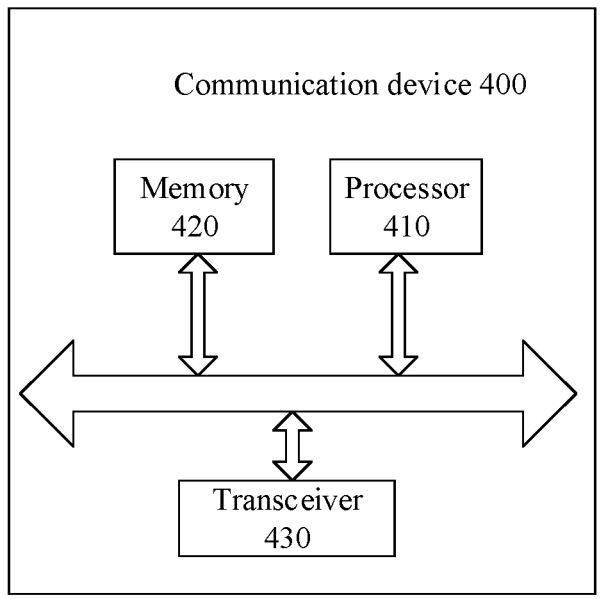
FIG. 4 is a schematic diagram of composition structure of a communication device according to an embodiment of the present disclosure.

FIG. 4 is a schematic structure diagram of a communication device 400 according to an embodiment of the present disclosure. The communication device 400 illustrated in FIG. 4 includes a processor 410, and the processor 410 may call and run a computer program in a memory to implement the methods in the embodiments of the present disclosure.

Optionally, as illustrated in FIG. 4, the communication device 400 may further include the memory 420. The processor 410 may call and run the computer program in the memory 420 to implement the methods in the embodiments of the present disclosure.

The memory 420 may be an independent device independent of the processor 410 or may be integrated into the processor 410.

Optionally, as illustrated in FIG. 4, the communication device 400 may further include a transceiver 430. The processor 410 may control the transceiver 430 to communicate with another device, specifically sending information or data to another device or receiving information or data sent by another device.

The transceiver 430 may include a transmitter and a receiver. The transceiver 530 may further include antennae, and the number of the antennae may be one or more.

Optionally, the communication device 400 may specifically be a network device of the embodiment of the present disclosure, and the communication device 400 may implement corresponding flows implemented by the network device in each method of the embodiments of the present disclosure. For simplicity, elaborations are omitted herein.

Optionally, the communication device 400 may specifically be a terminal device or network device of the embodiment of the present disclosure, and the communication device 400 may implement corresponding flows implemented by the mobile terminal/terminal device in each method of the embodiments of the present disclosure. For simplicity, elaborations are omitted herein.

Figure 5:
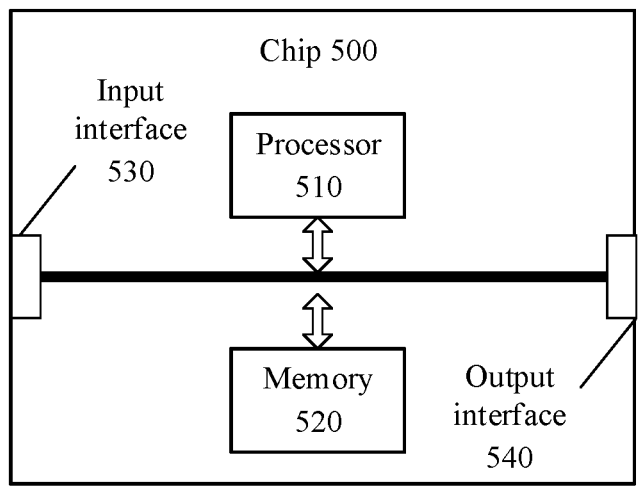
FIG. 5 is a schematic block diagram of a chip according to an embodiment of the present disclosure.

FIG. 5 is a schematic structure diagram of a chip according to another embodiment of the present disclosure. The chip 500 illustrated in FIG. 5 includes a processor 510, and the processor 510 may call and run a computer program in a memory to implement the methods in the embodiments of the present disclosure.

Optionally, as illustrated in FIG. 5, the chip 500 may further include the memory 520. The processor 510 may call and run the computer program in the memory 520 to implement the methods in the embodiments of the present disclosure.

The memory 520 may be an independent device independent of the processor 510 or may be integrated into the processor 510.

Optionally, the chip 500 may further include an input interface 530. The processor 510 may control the input interface 530 to communicate with another device or chip, specifically acquiring information or data sent by another device or chip.

Optionally, the chip 500 may further include an output interface 540. The processor 510 may control the output interface 540 to communicate with another device or chip, specifically outputting information or data sent by another device or chip.

Optionally, the chip may be applied to the network device of the embodiments of the present disclosure, and the chip may implement corresponding flows implemented by the network device in each method of the embodiments of the present disclosure. For simplicity, elaborations are omitted herein.

Optionally, the chip may be applied to the terminal device of the embodiments of the present disclosure, and the chip may implement corresponding flows implemented by the terminal device in each method of the embodiments of the present disclosure. For simplicity, elaborations are omitted herein.

It is to be understood that the chip mentioned in the embodiment of the present disclosure may also be called a system-level chip, a system chip, a chip system or a system on chip, etc.

Figure 6:
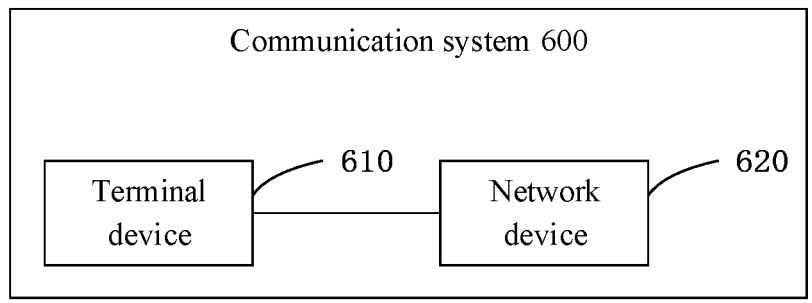
FIG. 6 is a second schematic diagram of an architecture of a communication system according to an embodiment of the present disclosure.

FIG. 6 is a schematic block diagram of a communication system 600 according to an embodiment of the present disclosure. As illustrated in FIG. 6, a communication system 600 includes a terminal device 610 and a network device 620.

The terminal device 610 may be configured to realize corresponding functions realized by the terminal device in the method, and the network device 620 may be configured to realize corresponding functions realized by the network device in the method. For simplicity, elaborations are omitted herein.

It is to be understood that the processor in the embodiment of the present disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the present disclosure may be implemented or executed. The universal processor may be a microprocessor or the processor may also be any conventional processor and the like. The steps of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the present disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the present disclosure is intended to include, but not limited to, memories of these and any other proper types.

It is to be understood that the memory is exemplarily but unlimitedly described. For example, the memory in the embodiments of the present disclosure may also be an SRAM, a DRAM, an SDRAM, a DDR SDRAM, an ESDRAM, an SLDRAM and a DR RAM. That is, the memory in the embodiments of the present disclosure is intended to include, but not limited to, memories of these and any other proper types.

The embodiments of the present disclosure also provide a computer-readable storage medium, which is configured to store a computer program.

Optionally, the computer-readable storage medium may be applied to a network device in the embodiments of the present disclosure, and the computer program enables a computer to execute corresponding flows implemented by the network device in each method of the embodiments of the present disclosure. For simplicity, elaborations are omitted herein.

Optionally, the computer-readable storage medium may be applied to a mobile terminal/terminal device in the embodiments of the present disclosure, and the computer program enables a computer to execute corresponding flows implemented by the terminal device in each method of the embodiments of the present disclosure. For simplicity, elaborations are omitted herein.

The embodiments of the present disclosure also provide a computer program product, which includes computer program instructions.

Optionally, the computer program product may be applied to a network device in the embodiments of the present disclosure, and the computer program instructions enable a computer to execute corresponding flows implemented by the network device in each method of the embodiments of the present disclosure. For simplicity, elaborations are omitted herein.

Optionally, the computer program product may be applied to a mobile terminal/terminal device in the embodiments of the present disclosure, and the computer program instructions enable the computer to execute corresponding flows implemented by the mobile terminal/terminal device in each method of the embodiments of the present disclosure. For simplicity, elaborations are omitted herein.

The embodiments of the present disclosure also provide a computer program.

Optionally, the computer program may be applied to a network device in the embodiments of the present disclosure, and the computer program runs on a computer to enable the computer to execute corresponding flows implemented by the network device in each method of the embodiments of the present disclosure. For simplicity, elaborations are omitted herein.

Optionally, the computer program may be applied to a mobile terminal/terminal device in the embodiments of the present disclosure, and the computer program runs on the computer to enable the computer to execute corresponding flows implemented by the mobile terminal/terminal device in each method of the embodiments of the present disclosure. For simplicity, elaborations are omitted herein.

Those of ordinary skill in the art may realize that the units and algorithm steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may be distributed to multiple network units. Part or all of the units may be selected to achieve the purpose of the solutions of the embodiments according to a practical requirement.

In addition, each functional unit in each embodiment of the present disclosure may be integrated into a processing unit, or each unit may physically exist independently, or two or more than two units may be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The abovementioned storage medium includes: various media capable of storing program codes such as a U disk, a mobile hard disk, a ROM, a RAM, a magnetic disk or an optical disk.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The inventioned claimed is:

1. A method for uplink data transmission, applied to a terminal device, comprising:
    receiving first signaling which is sent by a network side, the first signaling being configured to allocate an uplink licensed resource to the terminal device; and
    multiplexing data of a first Logical Channel (LCH) to the uplink licensed resource allocated through the first signaling for transmission.

2. The method of claim 1, wherein receiving the first signaling which is sent by the network side comprises:
    receiving a Physical Downlink Control Channel (PDCCH), which is scrambled through a first Radio Network Temporary Identifier (RNTI) and is sent by the network side, the first RNTI being one of a plurality types of RNTIs; and acquiring the uplink licensed resource allocated by the network side from Downlink Control Information (DCI) carried in the PDCCH.

3. The method of claim 2, wherein the first RNTI is configured to indicate a first Modulation and Coding Scheme (MCS) table, the first MCS table being one of a plurality of MCS tables.

4. The method of claim 3, wherein each MCS table is configured to indicate one or more MCSs.

5. The method of claim 4, wherein in the plurality of MCS tables, a reliability of service corresponding to a MCS indicated by the first MCS table is higher than a reliability of service corresponding to a MCS indicated by other MCS tables.

6. The method of claim 3, wherein the first RNTI corresponds to a first service type feature.

7. The method of claim 3, further comprising:
responsive to that the first service type feature is reliability, determining a reliability level corresponding to an MCS based on the MCS in the DCI which is carried in the PDCCH scrambled through the first RNTI.

8. The method of claim 6, further comprising:
acquiring different reliability levels corresponding to different MCSs.

9. The method of claim 3, further comprising:
responsive to that the first service type feature is reliability, acquiring a reliability level allocated by the network side based on an information bit field of the reliability level in the DCI which is carried in the PDCCH scrambled through the first RNTI.

10. A terminal device, comprising a processor and a memory which is configured to store a computer program capable of running on the processor, wherein the memory is configured to store the computer program, and the processor is configured to execute operations of:
receiving first signaling which is sent by a network side, the first signaling being configured to allocate an uplink licensed resource to the terminal device; and
multiplexing data of a first Logical Channel (LCH) to the uplink licensed resource allocated through the first signaling for transmission.

11. The terminal device of claim 10, wherein the processor receives a Physical Downlink Control Channel (PDCCH), which is scrambled through a first Radio Network Temporary Identifier (RNTI) and is sent by the network side, the first RNTI being one of a plurality types of RNTIs; and
the processor acquires the uplink licensed resource allocated by the network side from Downlink Control Information (DCI) carried in the PDCCH.

12. The terminal device of claim 11, wherein the first RNTI is configured to indicate a first Modulation and Coding Scheme (MCS) table, the first MCS table being one of a plurality of MCS tables.

13. The terminal device of claim 12, wherein each MCS table is configured to indicate one or more MCSs.

14. The terminal device of claim 13, wherein in the plurality of MCS tables, a reliability of service corresponding to a MCS indicated by the first MCS table is higher than a reliability of service corresponding to a MCS indicated by other MCS tables.

15. The terminal device of claim 12, wherein the first RNTI corresponds to a first service type feature.

16. The terminal device of claim 12, wherein the processor, responsive to that the first service type feature is reliability, determines a reliability level corresponding to an MCS based on the MCS in the DCI which is carried in the PDCCH scrambled through the first RNTI.

17. The terminal device of claim 12, wherein the processor acquires different reliability levels corresponding to different MCSs.

18. The terminal device of claim 12, wherein the processor, responsive to that the first service type feature is reliability, acquires a reliability level allocated by the network side based on an information bit field of the reliability level in the DCI which is carried in the PDCCH scrambled through the first RNTI.

19. The terminal device of claim 12, wherein the processor configures first indication information for the at least one LCH, the first indication information being configured to indicate whether the LCH corresponds to an indication field of the first RNTI.

20. A network device, comprising a processor and a memory which is configured to store a computer program capable of running on the processor, wherein the memory is configured to store the computer program, and the processor is configured to execute operation of:
sending first signaling to a terminal device, the first signaling being configured to allocate an uplink licensed resource to the terminal device.

* * * * *